United States Patent
Dumbaugh et al.

[15] 3,661,601
[45] May 9, 1972

[54] OPAL GLASS COMPOSITIONS

[72] Inventors: William H. Dumbaugh; James E. Flannery; George B. Hares, all of Corning, N.Y.

[73] Assignee: Corning Glass Works, Corning, N.Y.

[22] Filed: Mar. 21, 1969

[21] Appl. No.: 809,317

[52] U.S. Cl. ..............................106/54, 106/39 DV, 106/53
[51] Int. Cl. .........................................C03c 3/04, C03c 3/08
[58] Field of Search......................106/39 D V, 54, 53; 65/33

[56] References Cited

UNITED STATES PATENTS

| | | |
|---|---|---|
| 2,394,502 | 2/1946 | Weyl et al..............................106/54 X |
| 2,882,173 | 4/1959 | Welsch ..................................106/54 X |
| 3,384,508 | 5/1968 | Bopp et al..............................106/54 X |
| 3,413,133 | 11/1968 | Stalego ..................................106/54 X |
| 3,459,574 | 8/1969 | Willcox..................................106/54 X |

FOREIGN PATENTS OR APPLICATIONS

| | | |
|---|---|---|
| 1,016,640 | 1/1966 | Great Britain........................106/54 X |
| 1,104,363 | 11/1955 | France......................................106/54 |

OTHER PUBLICATIONS

McMillan, P. W., Glass Ceramics, Academic Press, London and New York, 1964, pp. 71–74.

*Primary Examiner*—Tobias E. Levow
*Assistant Examiner*—M. Bell
*Attorney*—Clarence R. Patty, Jr. and Gerald S. Geren

[57] ABSTRACT

This invention relates to spontaneously opacifiable glasses containing fluorine and having as the principal opacifying phase an immiscible, or insoluble, fluorine containing glass; the opal is an alkali aluminosilicate glass with additions of divalent oxides, fluorine, and boric-oxide. These glasses are opacified by cooling the glass body from the melt to a temperature below about the opal liquidus thereof at a rate greater than about 2° C./minute so as to homogeneously separate an insoluble glassy opacifying phase.

3 Claims, 3 Drawing Figures

INVENTORS.
William H. Dumbaugh
James E. Flannery
George B. Hares
BY
ATTORNEY

OPAL GLASS COMPOSITIONS

BACKGROUND OF THE INVENTION

Opal glasses are well known to the art and are glasses in which a second phase is dispersed therein and there is a difference between the refractive index of the second phase and the matrix. This difference in refractive index causes the opacification of the glass. Opal glasses are desirable for consumer product applications, such as tableware; however, in such products the cost of manufacture is a significant consideration in the choice of the opal which is to be used. Thus, spontaneously opacifiable glasses are preferred to glasses opacified by subsequent heat treatment. There are two types of spontaneously opacifiable glasses. The first type can be characterized by the opacifying phase being crystalline, such opals are normally of a fluoride composition with sodium fluoride or calcium fluoride being the opacifying phase. In high speed operations wherein the cooling rate of the glass is quite rapid, the fluorine-containing crystallized opals can be poorly opacified. This seems to be related to the fact that as the cooling rate is increased, the crystallite size is smaller and, thus, the opacity less. The other type of spontaneous opal can be characterized by the separation of a second glassy phase (not a crystalline phase); these opals may be said to be immiscible opals, or opals wherein the opacifying phase is a glass which is not soluble in the matrix. The two most common types of immiscible opals are those which contain phosphate or borate in the opacifying phase. For examples of such glasses see U.S. Pat. Nos. 2,559,805 and 3,275,492. Unfortunately, these immiscible opals are not desirable for the particular application due to problems relating to the expansion and viscosities of those types of glasses. Those opals may also be quite pale when cooled rapidly.

SUMMARY OF THE INVENTION

Quite unexpectedly, we have discovered that we can produce a dense, immiscible opal in a low fluorine content glass system by rapidly cooling the glass from the melt to below about the opal liquidus temperature. This discovery is quite surprising in view of the fact that spontaneous opals containing fluorine normally contain a crystalline opacifying phase; moreover, as the level of fluorine in the glass was decreased, the crystallinity and thus the opaqueness of the glass decreased. Fluorine has been used in immiscible opals before but not in the system used herein. Therefore, the fact that a very dense and opaque fluorine containing glass can be produced wherein the opacifying phase is immiscible in the matrix is quite surprising. The discovery that these opals can be produced at very fast cooling rates is also surprising in view of the fact that the art teaches that as the cooling rate of the fluorine containing glasses is increased, the opacity decreases. Moreover, the fluorine containing opals of our invention have the proper expansion and viscosities so as to produce a useful consumer product. Furthermore, this opal is useful as the core glass in the laminated structure as described in U.S. Pat. application Ser. No. 735,074. More specifically, we have found that alkali aluminosilicate glasses having about the following composition can be treated so as to produce the immiscible opals as described above. These glasses consist essentially, in weight percent as calculated from the batch on the oxide basis, of 50–75% $SiO_2$, 3–9% $Al_2O_3$, 11–20% CaO, 1–7% $B_2O_3$, 2–4% F, and the total $Na_2O$ and $K_2O$ being between 3–10%. In addition to the oxides above, various other optional oxides may be added to produce other desirable properties. The total of the constituents given above should comprise at least about 85 percent of the glass. We have found that when the glasses as described above are cooled from the melting temperature to below the opal liquids, preferably to below about the strain point, at a rate greater than about 2° C./minute an immiscible opal is produced.

DESCRIPTION OF THE PREFERRED EMBODIMENT

Figure 1:
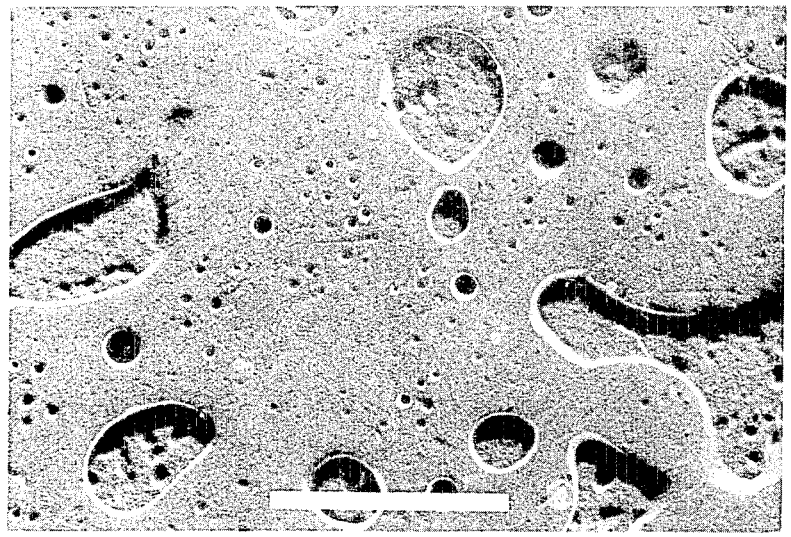
FIG. 1 is a photomicrograph of an as-cooled, spontaneously opacified glass; the marker bar represents a length of 1.0 micron.

The glasses of our invention require a combination of several factors in order to produce the desired product. The most important of these factors are the glass composition and the fooling rate. The composition of the glasses of our invention, as hereinafter described, is set forth in weight percent on the oxide basis as calculated from the batch.

The glasses should contain between about 50–75 percent by weight silica. Below 50 percent, the viscosity is too low and above about 75 percent the viscosity is too high. $Al_2O_3$ should be between about 3–9 percent. Above about 9 percent, the liquidus is too high and below 3 percent, the viscosity at the liquidus temperature and opacity may be too low. $B_2O_3$ should be between about 1–7 percent. Below about 1 percent $B_2O_3$, the opacity may be poor while above about 7 percent, the viscosity may be too low. Fluoride should be between about 2–4 percent. Below about 2 percent fluoride, the opacity is quite poor whereas above 4 percent, undesirable crystalline phases being to separate. The total of $Na_2O$ and $K_2O$ should be between about 3 and 10 percent. Individually, $Na_2O$ and $K_2O$ can be between 0–7 percent provided, of course, that the total of the $Na_2O$ and $K_2O$ is between 3–10 percent. Below 3 percent total $Na_2O$ and $K_2O$, the coefficient of thermal expansion is too low and above 10 percent, the viscosity of the glass is too low. CaO must be present between about 11–20 percent by weight. Below 11 percent, the opacity may be low whereas above 20 percent, the expansion may be too high and the viscosity too low. Optionally, MgO may be present between about 0–3 percent. However, above 3% MgO, the opacity may be too low. The aforementioned constituents should comprise at least about 85 percent of the glass. To the glasses above, from 0–10 percent total of at least one compound selected from the group consisting of BaO, SrO, $P_2O_5$, $La_2O_3$, $TiO_2$, $Nb_2O_5$, ZnO, $GeO_2$, PbO, $Bi_2O_3$, and $CeO_2$ may be added. Moreover, from 0–5 percent total of oxides containing coloring ions selected from the group consisting of Cr, Mn, Fe, Co, Cu, V, Ni, U, and the rare earths may also be added to the glass. The rare earths are those elements having an atomic number between 57 and 71 inclusive.

Glasses having the aforementioned compositions are prepared by heating the batch constituents to a temperature between about 1,400°–1,550° C. The glass is then removed from the melting unit and cooled at a rate of greater than about 2° C./minute to below about the opal liquidus of the glass, and preferably to below about the strain point of the glass. The opal liquidus is that temperature at which, upon cooling, the opacifying phase begins to separate. In these glasses it is the temperature at which opacifying phase separates from the matrix as minute droplets dispersed throughout the glass. The opal liquidus for these glasses is normally between about 1,100° and 1,250° C. At about the strain point no further phase separation can occur. From below the opal liquidus, and preferably the strain point, the glass may be cooled at any desired rate to the ambient temperature. In actual production conditions, it has been found that the glass is cooled to below the strain point at a rate of about 600° C./minute. From a theoretical point of view, the maximum rate at which the glass can be cooled is limited only by the rate at which the heat can be extracted from the glass. Thus, any limitation with respect to maximum cooling rate is generally related to equipment and processing conditions.

We have found that a convenient way of determining the desirability of a glass composition is to prepare in a small crucible a molten bath of glass and then insert thereinto a small sheet, approximately one-fourth inch thick, of a heat resistant glass. The sheet is maintained therein only until the immersed surface has been wetted by the molten glass; then the sheet is withdrawn and a second sheet of glass is drawn out between the inserted glass and the surface of the molten bath. The second sheet which is drawn out is usually between about 0.015 and 0.030 inch thick. This second sheet cools very quickly, at a rate much greater than 2° C./minute; thereafter by visual examination it can be determined whether or not opacification has occurred and, if so, to what extent. This test is a rough guide as to determining the opacification rate and extent of opacification of various glass compositions.

The microstructure of the as-cooled glass, can be thought of as similar to an oil-water emulsion wherein droplets of oil are suspended in water. The opacifying phase is immiscible in the glass matrix and upon cooling assumes a generally spherical shape, or a somewhat irregular shape as seen in FIG. 1. The glass of FIG. 1 has the composition of glass No. 2 of Table I. Normally, the opacifying phase should comprise between about 10–40 volume percent of the total glass volume. The volume percent of opacifying phase may be determined in accordance with the method described in Journal of the American Ceramic Society, Volume 47, p. 365–367 (1965). Furthermore, the opacifying phase particles should have dimensions between about 0.025 and 4.0 microns. We have found that the dimensions are normally between about 0.5 and 2.0 microns. The phase separated droplets, or opacifying particles, are believed to contain CaO and F, or CaO, F, $B_2O_3$, and $SiO_2$. X-ray diffraction studies have verified the fact that the as-cooled opacifying particles are non-crystalline. The opals of this invention are a dense white color, have been shown to have a greater opal density than the fluoride opals of the prior art, and are at least as dense as the phosphate and borate opals formed at normal mechanical forming rates.

Figure 3:
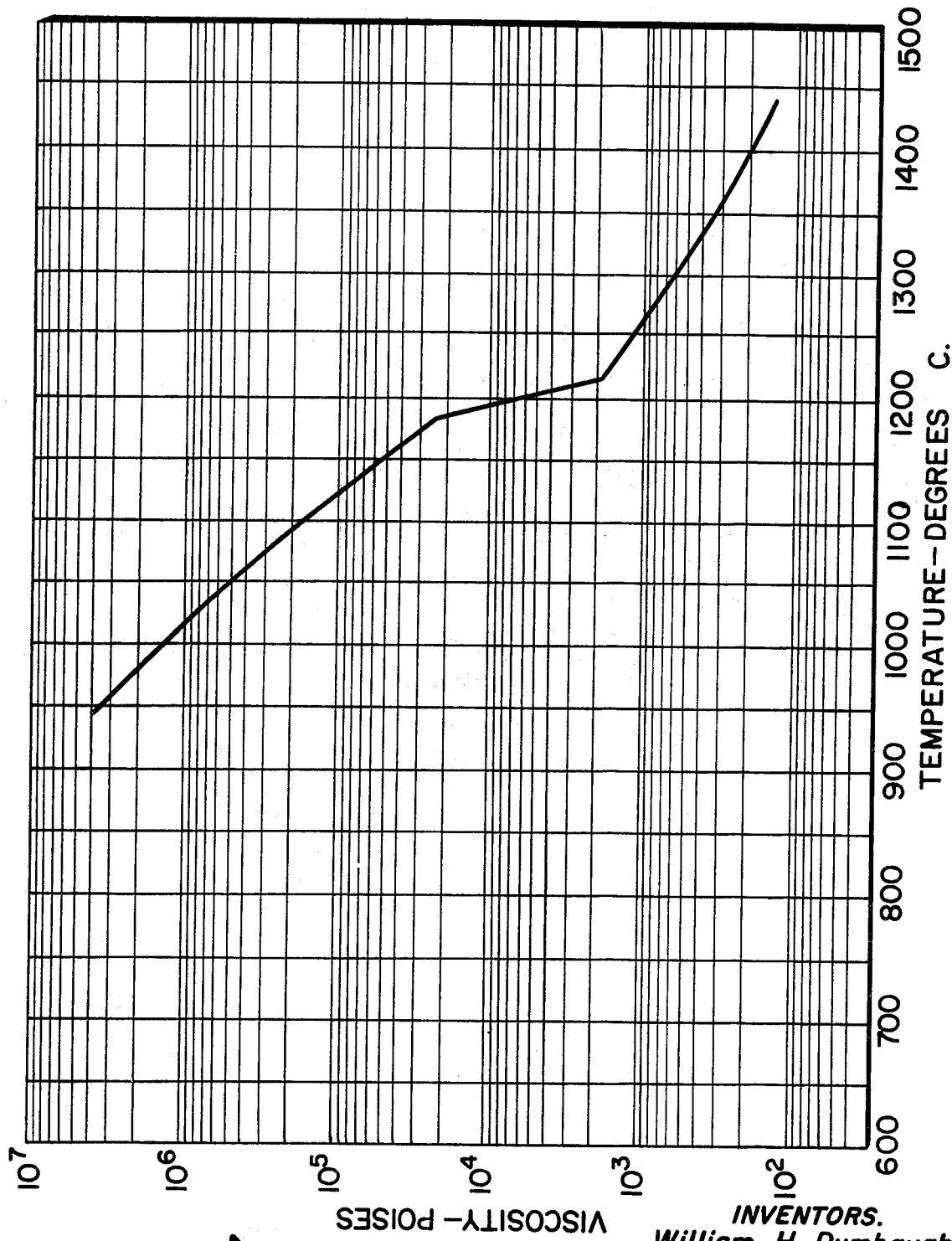
FIG. 3 is a typical temperature-viscosity curve for the glasses of this invention.

As these glasses are cooled from the melt, it is found that the rate of change of viscosity with temperature is fairly uniform. However, as the opal liquidus temperature is approached the rate of change of viscosity with temperature significantly increases. This change is related to the viscosity increase due to the separation of the opacifying phase at the opal liquidus. After the phase separation, or opalization, is substantially completed the rate of change of viscosity with temperature is fairly uniform again. FIG. 3 is a typical temperature-viscosity curve for the glasses of this invention and this curve depicts the characteristics as described above. This curve has been produced by cooling glass No. 2 of Table I, which is shown in FIG. 1, at a rate of about 2° C./minute. We have found that the best way to form articles from this type of glass is to form them at a temperature below which opacification is completed.

Figure 2:
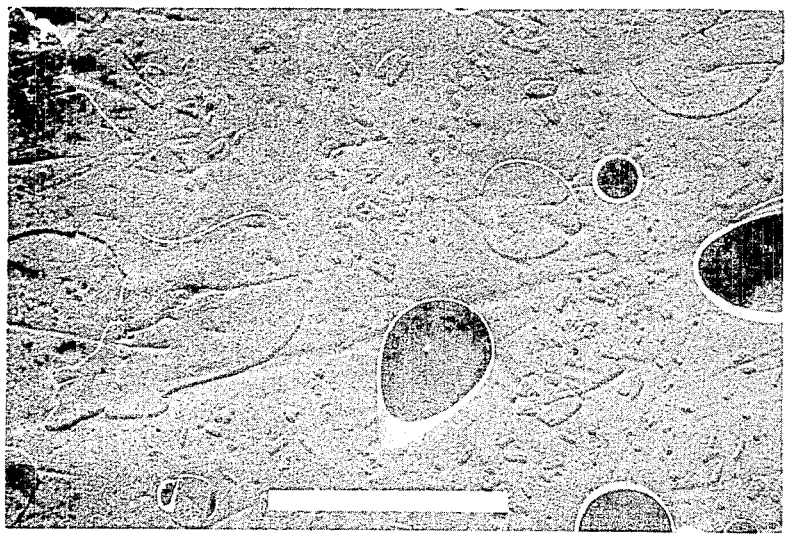
FIG. 2 is a photomicrograph of a heat treated spontaneously opacified glass; the marker bar represents a length of 1.0 micron.

The amorphous opacifying phase can be converted to a crystalline phase by a subsequent heat treatment. This treatment comprises heating the glass to a temperature between about the annealing point and the temperature at which the article will deform, for a sufficient length of time to at least partially crystallize the amorphous droplets. Depending upon the size and shape of the article, and the support thereof, the treatment temperature may be as high as about 175° C. above the annealing point. The length of treatment time will vary with the section size of the sample and the percent crystalline conversion desired. For section sizes between about 0.060 inch and 0.125 inch, and for substantially complete conversion the times can be between about 5 minutes and 4 hours. Of course, for less than complete conversion, the times or temperatures may be reduced. The crystalline phase which develops from the amorphous droplets is believed to be calcium fluoride and an unknown phase whose X-ray diffraction peaks resemble those of Xonotlite. FIG. 2 is a micrograph of the glass as shown in FIG. 1 which has been crystallized. It is seen that most of the amorphous droplets are now crystalline.

The glass of FIG. 1 was heated to 785° C. and held thereat for about 10 minutes. In general, the crystallized glasses exhibit little, if any, changes in physical properties.

The glasses of this invention may be used by themselves in order to form the desired product. However, we have found that these glasses are particularly useful for the core glasses of a laminate such as disclosed in U.S. Pat. application Ser. No. 735,074. The basic unit of that invention comprises a tensilely stressed core portion having adhered thereto and being substantially enveloped by a compressively stressed layer. In the preferred embodiment the laminate is a three-ply glass sheet. The laminated sheet is continuously hot-formed by melting batches for each glass and then fusing the core portion and the adhered layer together while shaping the laminate to the desired geometry. That application teaches that the viscosity of the core glass at the laminating temperature should be between about 1 and 6 times the viscosity of the layer adhered thereto. On an absolute basis, the viscosity of the core glass at the forming temperature, normally between 1,225° and 1,325° C. should be less than about 250,000 poises, preferably on the order of 4,000 poises. At those temperatures the glasses of our invention have viscosities between about 400 and 6,000 poises. Furthermore, that application teaches that the coefficient of thermal expansion of the core portion should be $15 \times 10^{-7}/°$ C. $(0°–300°C.)$ greater than the adhered plies and preferably between about 60 and $110 \times 10^{-7}/°C$. The glasses of this invention fit all the aforementioned requirements, and hence may be used in that laminate.

Table I below sets forth the composition and properties of various glasses made in accordance with our invention. These glasses were prepared by melting the appropriate batch materials at a temperature between about 1,400°–1,550° C. in a platinum crucible for a sufficient amount of time to completely fuse the batch. Typical batch materials which we used are as follows: Keystone No. 1 dry sand, fluorspar, A–1 calcined alumina, calcium carbonate, boric acid, sodium carbonate, and dry potassium carbonate.

TABLE I

|  | 1 | 2 | 3 | 4 | 5 | 6 |
|---|---|---|---|---|---|---|
| $SiO_2$ | 67.8 | 63.8 | 60.0 | 61.9 | 67.1 | 65.2 |
| CaO | 15.4 | 15.0 | 14.0 | 17.8 | 12.6 | 14.0 |
| $Na_2O$ | 4.5 | 2.1 | 2.0 | 3.2 | 3.1 | 3.2 |
| $K_2O$ | 1.6 | 4.1 | 3.0 | 3.2 | 3.1 | 3.2 |
| $Al_2O_3$ | 6.1 | 6.2 | 5.0 | 6.2 | 6.2 | 6.3 |
| F | 3.4 | 3.3 | 3.0 | 3.2 | 3.4 | 3.5 |
| $B_2O_3$ | 1.2 | 4.8 | 3.0 | 4.5 | 4.5 | 4.6 |
| MgO |  | 0.7 |  |  |  |  |
| Annealing point, °C | 668 | 631 | 740 | 624 | 636 | 612 |
| Strain point, °C | 622 | 577 | 651 | 567 | 580 | 561 |
| Expansion, $\times 10^{-7}/°$ C. (0–300° C.) | 71.1 | 70.7 | 63.1 | 73.8 | 68.0 | 67.4 |
| Density, g./cc | 2.461 | 2.461 | 2.425 | 2.510 | 2.451 | 2.454 |

The glasses of Table I can be prepared by themselves and utilized by themselves. However, they can also be fabricated to form a laminate as disclosed in the aforementioned copending application. The example below exemplifies the laminate which can be produced using the glasses of our invention.

EXAMPLE 7

A glass for the adhered plies of the following composition was melted: 58.25% $SiO_2$, 14.8% $Al_2O_3$, 6.25% $B_2O_3$, 15.0% CaO, and 5.7% MgO. A spontaneous opal having the composition of glass No. 2 was also melted. These glasses were formed into sheets and then fused together at about 1,250° C. so as to form a three-ply laminated sheet wherein the spontaneous opal was the core glass and center ply. At 1,250° C. the viscosity of the core glass was about 1,200 poises while that of the adhered plies was about 700 poises. Thus, the viscosity ratio of core to the adhered ply layers at the laminating temperature was about 1.7:1. The opal liquidus temperature of the core was determined to be 1,220° C. The internal liquidus of the adhered plies was determined to be 1,089° C. The hot laminated sheet was next sagged into a custard cup shaped mold, trimmed, removed from the mold, and allowed to cool. The resultant custard cup had a rim diameter of 4½ inches, a bottom diameter of 3 inches, and was 1 3/8 inch high. The core glass was 0.080 inch thick and the total thickness of the adhered plies was 0.004 inch resulting in a thickness ratio of about 20:1. The coefficient of thermal expansion of the core glass was $70.1 \times 10^{-7}/°C$ while that of the adhered plies was $47 \times 10^{-7}/°C$. This combination of thickness ratios and expansion mismatch resulted in a body exhibiting an MOR of about 30,000 psi. The cup was observed to be a very dense white and opaque body.

We claim:

1. A spontaneous opal glass wherein insoluble glassy particles constitute the opal phase consisting essentially, in weight percent on the oxide basis as calculated from the batch, of about 50–75% $SiO_2$, 3–9% $Al_2O_3$, 11–20% CaO, 1–7% $B_2O_3$, 2–4% F, and 3–10% total $Na_2O + K_2O$ consisting of 0–7% $Na_2O$ and 0–7% $K_2O$, the sum of the aforementioned oxides constituting at least about 85 percent of said glass.

2. The glass as recited in claim 1 wherein said glass contains from about 0 to 10 percent total of at least one compound selected from the group consisting of BaO, SrO, $P_2O_5$, $La_2O_3$, $TiO_2$, $Nb_2O_5$, ZnO, $GeO_2$, PbO, $Bi_2O_3$, and $CeO_2$.

3. The glass as recited in claim 1 wherein said glass also contains from about 0 to 5 percent total of at least one oxide containing coloring ion selected from the group consisting of Cr, Mn, Fe, Co, Cu, V, Ni, U, and the rare earths.

* * * * *